US009306979B2

(12) United States Patent
Erickson et al.

(10) Patent No.: US 9,306,979 B2
(45) Date of Patent: Apr. 5, 2016

(54) POLICY ENFORCEMENT BY END USER REVIEW

(71) Applicant: MICROSOFT TECHNOLOGY LICENSING, LLC, Redmond, WA (US)

(72) Inventors: Boris A. Erickson, Seattle, WA (US); Kailas B. Bobade, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 165 days.

(21) Appl. No.: 13/867,793

(22) Filed: Apr. 22, 2013

(65) Prior Publication Data

US 2014/0317678 A1    Oct. 23, 2014

(51) Int. Cl.
*G06F 17/00* (2006.01)
*H04L 29/06* (2006.01)

(52) U.S. Cl.
CPC ...................................... *H04L 63/20* (2013.01)

(58) Field of Classification Search
CPC ............................ H04L 63/20; H04L 63/0227
USPC .......................................................... 726/1
See application file for complete search history.

(56) References Cited

U.S. PATENT DOCUMENTS

| 5,355,474 | A * | 10/1994 | Thuraisngham et al. ...... 707/759 |
| 7,945,467 | B2 * | 5/2011 | Moss ............................ 705/7.38 |
| 2006/0229993 | A1 * | 10/2006 | Cole ................................ 705/51 |
| 2008/0040169 | A1 * | 2/2008 | Moss ................................ 705/7 |
| 2008/0059520 | A1 * | 3/2008 | Moss ........................... 707/104.1 |
| 2013/0276055 | A1 * | 10/2013 | Jacobson ............................ 726/1 |

OTHER PUBLICATIONS

Parrish, Kevin., "Microsoft Reveals its Internal Xbox Live Police", Retrieved at <<http://www.tomsguide.com/us/Xbox-Live-Policy-and-enforcement-Unicorn-ninja-Boris-Erickson-vulcan,news-12075.html>>, Aug. 4, 2011, pp. 6.
Goldman, Tom., "PAX East 2010: The Secrets of Xbox Live Enforcement", Retrieved at <<http://www.escapistmagazine.com/forums/read/7.184115-PAX-East-2010-The-Secrets-of-Xbox-Live-Enforcement>>, Mar. 30, 2010, pp. 5.
"Xbox LIVE Suspensions and Xbox 360 Console Bans", Retrieved at <<http://support.xbox.com/en-US/xbox-live/account-banning-and-player-feedback/account-suspensions-and-console-bans>>, Retrieved Date: Jan. 14, 2013, pp. 3.

(Continued)

*Primary Examiner* — Teshome Hailu
(74) *Attorney, Agent, or Firm* — Aaron Chatterjee; Judy Yee; Micky Minhas

(57) ABSTRACT

Embodiments are disclosed that relate to enforcement of user policies in a multi-user interactive computing environment by end user review. For example, one disclosed embodiment provides, on a computing device, a method comprising receiving a notification of a current policy controversy, and sending information regarding the current policy controversy to each end user reviewer of a plurality of end user reviewers, each end user reviewer being a member of an enforcement federation of a plurality of enforcement federations. The method further comprises receiving enforcement decisions from one or more responding end user reviewers of the plurality of end user reviewers, and if the enforcement decisions received meet an enforcement threshold, then automatically enforcing a policy rule.

12 Claims, 12 Drawing Sheets

(56) References Cited

OTHER PUBLICATIONS

"Complaints, Compliments and Feedback", Retrieved at <<http://www.dva.gov.au/contact_us/Pages/feedback.aspx>>, Retrieved Date: Jan. 15, 2013, p. 1.
"Complaints and Feedback—Tell us What you Think", Retrieved at <<http://www.humanservices.gov.au/customer/information/feedback-complaints>>, Retrieved Date: Jan. 15, 2013, pp. 4.
Warren, Tom., "Microsoft details its "Secret" Xbox LIVE Policing Team", Retrieved at <<http://www.winrumors.com/microsoft-details-its-secret-xbox-live-policing-team/>>, Aug. 3, 2011, pp. 6.
"How Xbox Live Enforcement's "Vulcan" Tool Works", Retrieved at <<http://chrome-mods.com/index.php?/topic/147-the-secret-xbox-live-enforcement-tool-vulcan/>>, Nov. 16, 2012, pp. 2.
"Xbox Live Enforcement Team (How They Work)", Retrieved at <<http://www.thetechgame.com/Archives/t=2568793/xbox-live-enforcement-team-how-they-work.html>>, Retrieved Date: Jan. 15, 2013, pp. 13.
Plunkett, Luke., "The Xbox Live Police", Retrieved at <<http://kotaku.com/362810/the-xbox-live-police>>, Mar. 14, 2008, pp. 4.

* cited by examiner

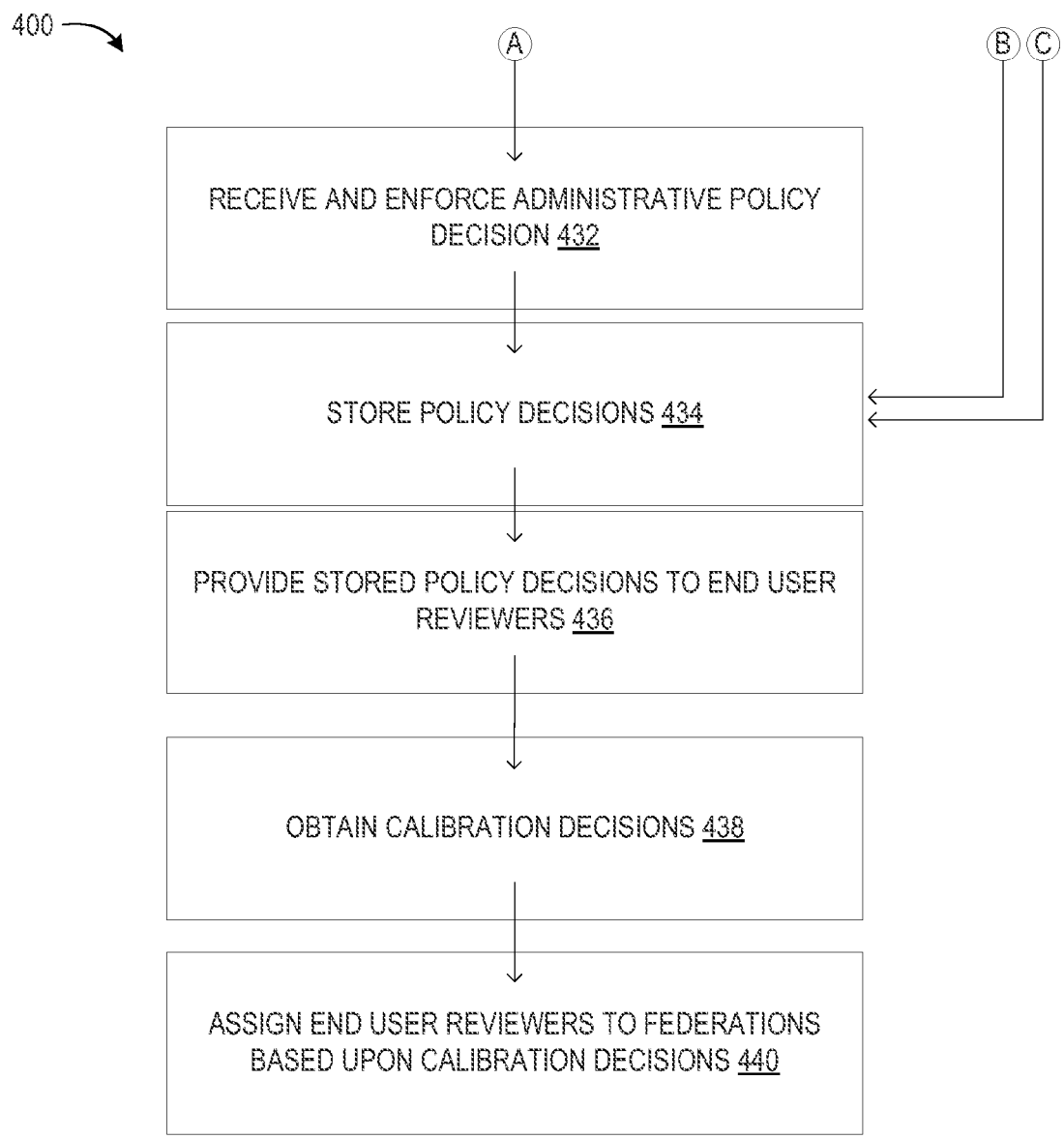

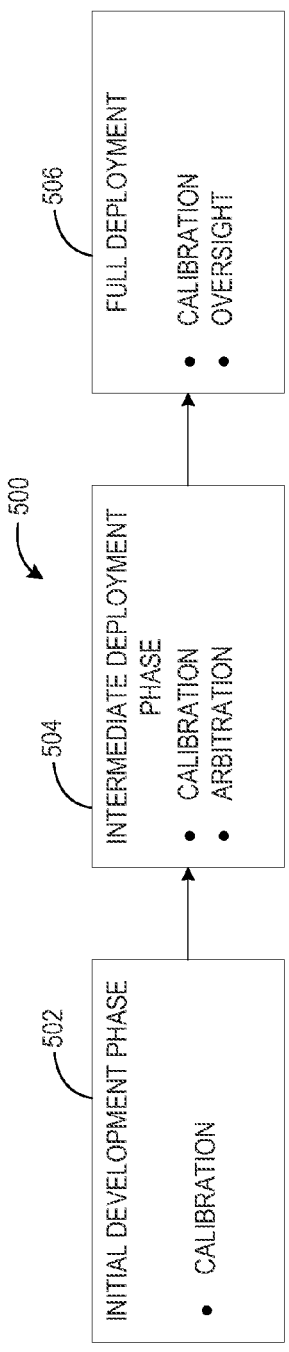

POLICY ENFORCEMENT BY END USER REVIEW

BACKGROUND

Multi-user interactive computing environments may utilize various policies that define permissible and impermissible behavior of end users. For example, a multi-user interactive computing environment that allows users to select user names may have policies regarding characteristics of permissible and impermissible user names. If one user makes a complaint that another user's user name is offensive, an administrative-level policy reviewer may review the asserted offensive user name against established user name policies to determine whether to take any enforcement action (e.g. rejection of user name) against the other user. Similar policies may be used to regulate other user actions.

SUMMARY

Embodiments are disclosed that relate to enforcement of user policies in a multi-user interactive computing environment by end user review. For example, one disclosed embodiment provides, on a computing device, a method comprising receiving a notification of a current policy controversy, and sending information regarding the current policy controversy to each end user reviewer of a plurality of end user reviewers, each end user reviewer being a member of an enforcement federation of a plurality of enforcement federations. The method further comprises receiving enforcement decisions from one or more responding end user reviewers of the plurality of end user reviewers, and if the enforcement decisions received meet an enforcement threshold, then automatically enforcing a policy rule.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B show a flow diagram depicting an embodiment of a method for deciding policy controversies via end user reviewers.

FIG. 5 shows a flow diagram depicting an embodiment of a method for implementing an end user reviewer-based policy decision system.

FIG. 6 shows a legend depicting symbols and associated definitions for FIGS. 7-9.

DETAILED DESCRIPTION

As mentioned above, administrative-level policy controversy reviewers may be utilized by an entity to decide controversies that arise under policies of an interactive multi-user computing environment. Administrative level reviewers may be agents of an entity providing the environment (e.g. a provider of a social network experience, multi-user online video game platform, collaborative productivity software environment, etc.). As the user base of such an environment grows, the number of controversies received may grow accordingly, which may require larger and larger investments in resources used to address controversies. Due to the nature of some policy controversies, machine intelligence solutions may be difficult to implement. For example, regarding user name controversies, formatting and spelling tricks combined with the generally flexible nature of written language may increase the difficulty of designing logic to identify user names that violate policy. Similar issues may arise in the context of chat sessions and other interactive features that utilize written language authored by end users.

As a result, human evaluation currently may be the most effective method of evaluating such controversies. However, scaling the number of administrative-level review agents to handle such controversies in a growing multi-user interactive computing environment may be expensive, and thus not cost-effective.

Figure 1:
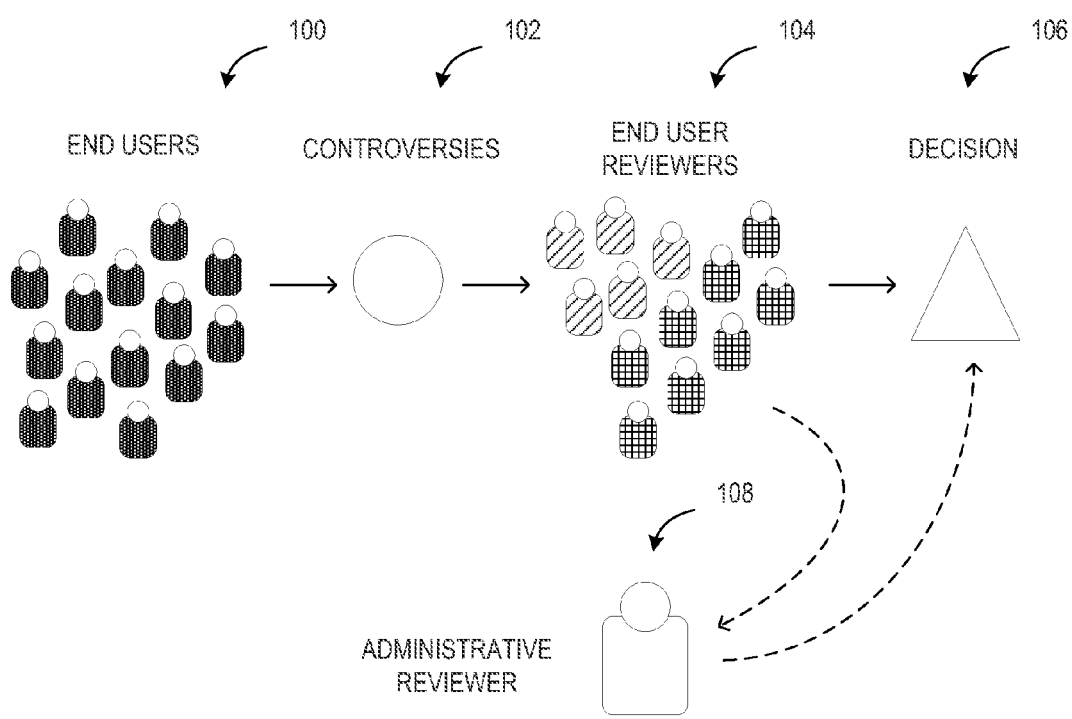
FIG. 1 shows a schematic depiction of an embodiment of an end user reviewer-based policy enforcement system.

Accordingly, embodiments are disclosed herein that relate to the use of end user reviewers to decide policy controversies in a multi-user interactive computing environment. Referring to FIG. 1, users 100 of a multi-user interactive computing environment may submit policy controversies 102, such as complaints about other users, for consideration by end user reviewers 104. Upon receiving sufficient end user reviewer enforcement decisions to meet a threshold condition, a policy decision 106 may be automatically made and enforced, without the involvement of an administrative reviewer 108. The end user reviewers may be vetted to ensure that they meet various qualifications, and/or may be calibrated such that an accuracy weighting factor may be associated with each end user reviewer. This may allow end user reviewers with higher accuracy weightings to be more influential in policy controversy resolution than end user reviewers with lower accuracy weightings.

Any suitable action may be taken in response to the end user reviewer decisions received. For example, where the end user reviewers are largely in agreement, the action may comprise an enforcement action or non-enforcement action that is performed automatically. On the other hand, where the end user reviewers are in dispute, or where insufficient end user review has taken place, a policy controversy may be forwarded to administrative reviewer 108 for an administrative-level decision. In this matter, a large majority of policy controversies may be automatically handled based upon the end user reviewer decisions received, and a smaller subset may be handled by administrative reviewer agents. This may help to reduce the burden on administrative reviewers, and thereby may help to conserve human and financial resources.

The accuracy weightings of end user reviewers may be continuously updated, such that users may be assigned higher or lower accuracy weightings as the user's determined accuracy changes. In some embodiments, the users may be placed into "federations" of users with similar determined accuracies, and all users in a federation may share an accuracy weighting. Two such federations are schematically depicted in FIG. 1, with different cross-patching patterns for the end user reviewers 104 indicating different federation membership. In other embodiments, accuracy weightings may be applied in any other suitable manner.

Figure 2:
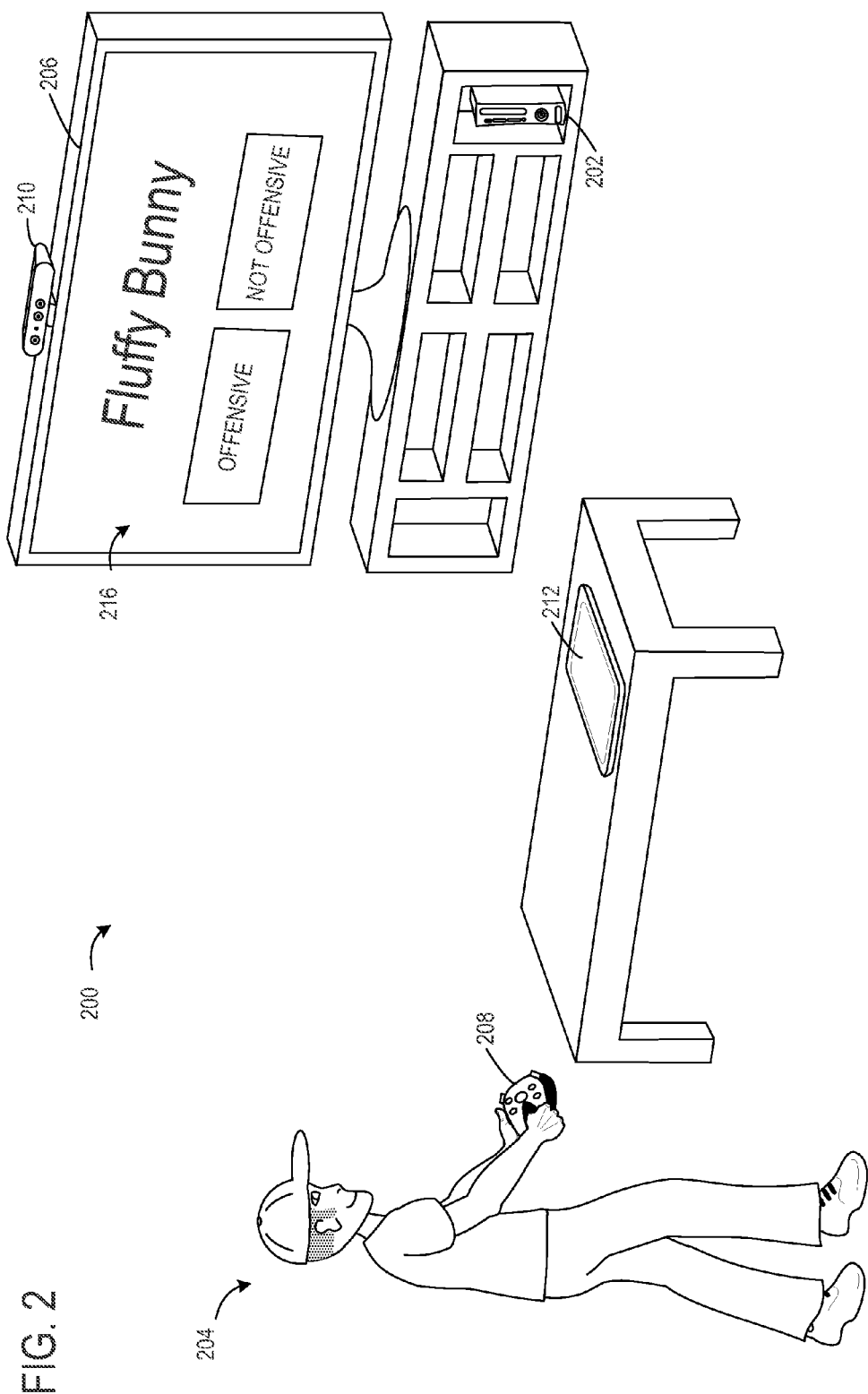
FIG. 2 shows an example embodiment of a use environment illustrating an end user reviewer reviewing a policy controversy.

FIG. 2 shows an example embodiment of a use environment 200 in which a computing device 202 is used to present a policy controversy to an end user reviewer 204 via a display device 206. The computing device 202 may represent any suitable type of computing device, including but not limited to a desktop computer, a video game console, a set-top box, etc. The end user reviewer 204 may interact with the computing device 202 via any suitable user input device. Examples include, but are not limited to, a video game controller 208 and an environmental sensor system 210 comprising one or more image sensors (two-dimensional and/or depth image sensors operating in visible, infrared, and/or other suitable wavelengths of light) and/or microphones useable to detect acoustic inputs (e.g. speech inputs), respectively.

The end user reviewer also may be presented with policy controversies via other computing devices, such as a tablet computer 212, a mobile device (e.g. a smart phone or media player), and/or any other device through which the user may interact with a multi-user interactive computing environment.

The policy controversy is depicted as displayed on a user interface 216 displayed on the display device 206. The depicted policy controversy comprises a complaint about a user name, but it will be understood that any other suitable policy controversy may be presented. Examples include, but are not limited to, offensive language used in chat or other interactive activities, other offensive aspects of a user profile than user name, and/or demonstrations of cheating or system manipulation.

As described in more detail below, both past and current policy controversies may be presented to users. For example, past policy controversies for which a decision has already been made, either administratively or via the community of end user reviewers, can be presented for the purpose of determining an accuracy of an end user reviewer's decisions compared to the past decisions. The accuracy information determined may then be utilized to determine an accuracy weighting for the end user reviewer's decisions on current policy controversies. Such calibration against past decisions may help to establish a level of trust that the end user reviewer will reach a similar decision as an administrative reviewer would with regard to a current controversy. In some embodiments, as mentioned above, users with similar determined accuracies may be placed into federations of end user reviewers, such that end user reviewers in a same federation have a same accuracy weighting. In other embodiments, the determined accuracy of a user may be applied in any other suitable manner.

Figure 3:
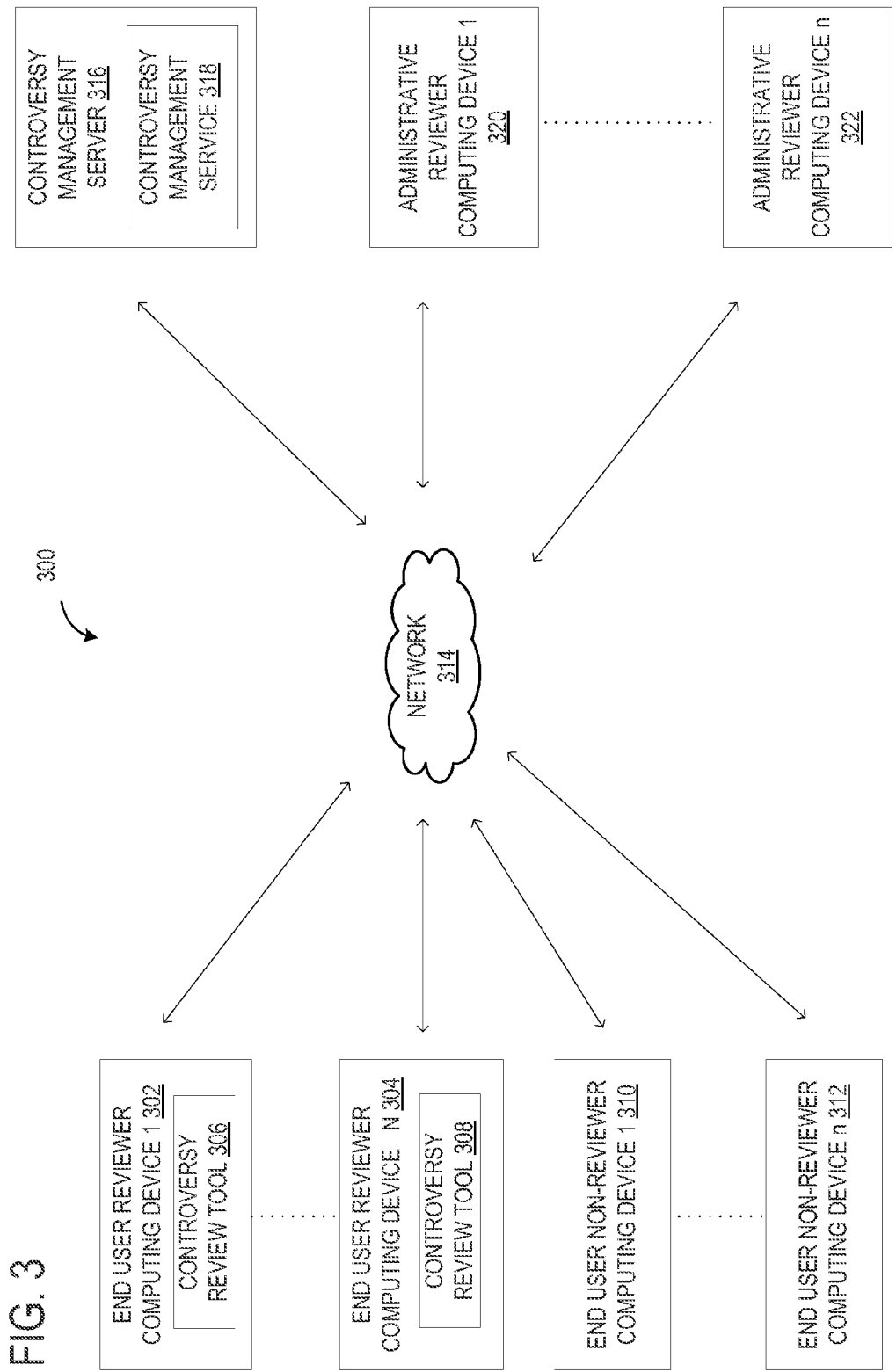
FIG. 3 shows a block diagram of an embodiment of a multi-user interactive computing environment.

FIG. 3 shows a block diagram depicting an embodiment of a multi-user interactive computing environment 300. Environment 300 comprises a plurality of computing devices associated with end user reviewers, illustrated as end user reviewer 1 computing device 302 and end user reviewer n computing device 304. Each end user reviewer computing device 302, 304 comprises a policy controversy review tool, illustrated respectively at 306 and 308, configured to receive and present information regarding past and current policy controversies to the end user reviewers, and also to receive inputs of enforcement decisions from the end user reviewers and communicate the enforcement decisions to a remote service.

The policy controversy review tool 306, 308 on each end user reviewer computing device may take the form, for example, of computer-readable instructions stored on the computing device and executed by the computing device. It will be understood that end user reviewers may review policy controversies with different types of computing devices, depending upon how each end user reviewer interacts with the multi-user interactive computing environment. It will further be understood that an end user reviewer may use multiple different devices to review policy controversies.

Environment 300 also comprises a plurality of computing devices associated with non-reviewer end users, illustrated as non-reviewer user computing device 1 310 and non-reviewer user computing device n 312. Non-reviewer end users may comprise users that have not requested to be end user reviewers and/or that have not been approved as end user reviewers. As described in more detail below, in some embodiments, an end user may be compared to various qualifications before being allowed to review policy controversies. As such, in some instances not all end users may participate in policy controversy resolution in a multi-user interactive computing environment according to the present disclosure.

End user reviewer computing devices and non-reviewer end user computing devices may communicate with a policy controversy management system via a network 314. An example policy controversy management system is illustrated as policy controversy management server 316 configured to operate a policy controversy management service 318 configured to communicate with the policy controversy review tools and manage the end user review policy enforcement system. It will be understood that the depicted block diagram is not intended to imply any specific hardware and/or software architectures for the policy controversy management server and service, and that the embodiments disclosed herein may be implemented via any suitable arrangement of computer hardware and software.

The policy controversy management service 318 may be configured to perform any suitable tasks related to end user review of policy controversies. For example, the policy controversy management service 318 may be configured to receive notifications of policy controversies (e.g. complaints) from users, to provide information regarding policy controversies (past and current) to end user reviewers, to receive enforcement decisions from end user reviewers, and to manage and track trust levels of end user reviewers to help ensure the robustness of the end user review process.

The policy controversy management service 318 also may be configured to take actions based upon the enforcement decisions of the end user reviewers. For example, the policy controversy management service 318 may automatically enforce or not enforce policy rules against complaint recipients, depending upon the outcome of an end user review of a current controversy. The policy controversy management service 318 also may be configured to forward policy controversies to administrative reviewers to resolve policy controversies that remain unresolved after end user review, such as in the case of close controversies. Thus, environment 300 comprises a plurality of administrative review computing devices, illustrated as administrative review computing device 1 320 and administrative review computing device n 322. It will be appreciated that the use of automatic policy enforcement based upon end user review may allow a relatively small number of administrative reviewers to be utilized compared to environments in which administrative reviewers are used to review all policy controversies.

Figure 4A:
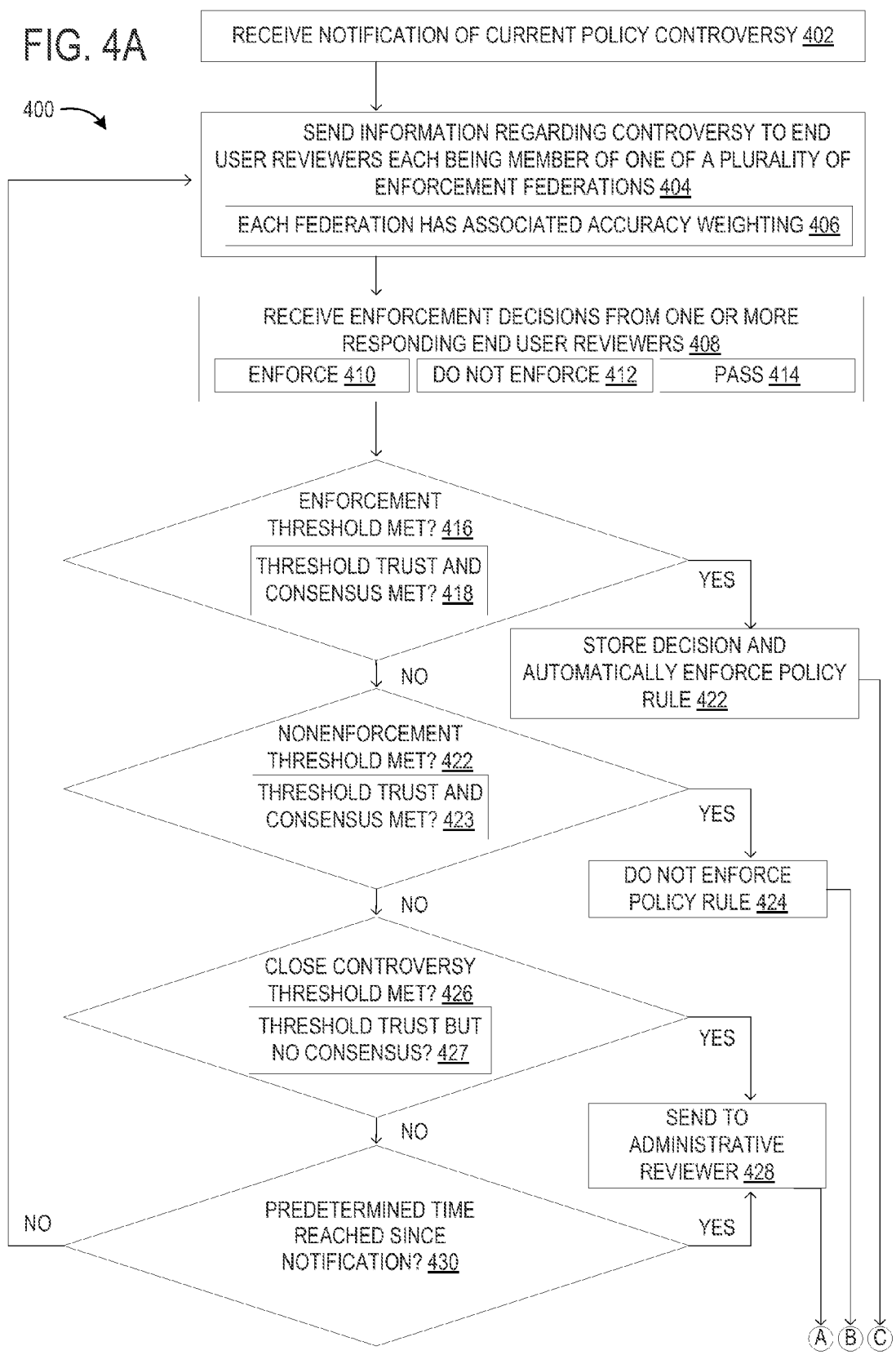

FIGS. 4A and 4B show a flow diagram depicting an example embodiment of a method 400 for deciding policy controversies via end user review. Method 400 is described from the point of view of a fully implemented end user review system. Example methods related to implementing an end user review system are described in more detail below.

Method 400 comprises, at 402, receiving a notification of a current policy controversy. The notification may take any form, including but not limited to complaints from end users against other end users for asserted breaches of policy. For example, a notification may take the form of a complaint from an end user regarding another end user's chosen user name, allegedly offensive language used by another end user in a chat session or other interactive activity, demonstrations of cheating or system manipulation, and the like.

In response, method 400 comprises, at 404, sending information regarding the current policy controversy to a plurality of end user reviewers, wherein each end user reviewer is a member of one of a plurality of enforcement federations. The end user reviewers may comprise any suitable set of end users. For example, in some embodiments, end user reviewers may be any member of the interactive computing environment community, while in other embodiments, minimum standards may be applied for an end user to be qualified as an end user reviewer. Examples of such minimum standards may include, but are not limited to, a minimum age, a minimum service level, a minimum status in the community, a minimum duration of membership in the community, a minimum achievement level in games or other activities provided by the environment, a minimum total time spent participating in the community, and/or any other suitable standards. Where minimum standards or other conditions are applied, a user that applies to be an end user reviewer but is refused may be provided with the reason or reasons that the user is not eligible to be an end user reviewer. Further, the user will not be provided with policy controversies for review unless and until the user becomes eligible and qualifies to be an end user reviewer.

An enforcement federation may comprise a group of users determined to have similar accuracy ratings in selecting the same enforcement decisions as administrative reviewers. As such, in some embodiments, end user reviewers may be assigned to enforcement federations based upon each user's performance in a calibration process in which past controversies are presented for end user review decision, and the end user review decisions are compared to administrative review decisions on those controversies. An example calibration process is described in more detail below with reference to FIG. 7.

Further, as indicated at 406, each enforcement federation may comprise an associated accuracy weighting. The accuracy weighting of an enforcement federation may be used to weight the value of decisions made by users in that federation, as it is reflective of a level of trust that members of that federation are likely to vote similarly to an administrative reviewer. Thus, enforcement decisions from higher-weighted end user reviewers may help to reach an enforcement threshold with fewer total enforcement decisions than from lower-weighted end user reviewers. Further, in some embodiments, members of low-rated federations may be excluded from reviewing current controversies. The use of weightings in this manner may help to prioritize contributions from users who are accurate, and to deemphasize or ignore contributions from users that attempt to abuse the system.

In some embodiments, the federation membership of an end user reviewer may be communicated to the end user reviewer, for example, as a form of achievement. In this manner, users may be motivated to achieve membership in higher-rated federations. Further, in some embodiments, while federation membership information may be available, the properties of the federations themselves may be kept secret to help ensure that federation membership is based upon an accurate assessment of each end user reviewer, rather than some end user reviewers gaming the system.

End user reviewer federations may be defined based upon any suitable accuracy criteria. One non-limiting example of a set of end user federations based upon accuracy ranges is shown in Table 1 below.

TABLE 1

| Federation name | Description | Weight |
| --- | --- | --- |
| Stellar | Has an accuracy rating between 90-100% | 1.50 |
| Excellent | Has an accuracy rating between 75-90% | 1.25 |
| Good | Has an accuracy rating between 50-75% | 1.00 |
| Mediocre | Has an accuracy rating between 25-50% | 0.50 |
| Terrible | Has an accuracy rating between 5-25% | 0.10 |
| Abominable | Has an accuracy rating between 0-5%. Excluded from participating in federated enforcement | 0.05 |
| Uncalibrated | Has an undetermined accuracy due to an incomplete calibration. Must complete calibration to be assigned to a federation. | 0.01 |

Continuing, method 400 next comprises, at 408, receiving enforcement decisions from one or more responding end users. The enforcement decisions may comprise any suitable information. For example, in some embodiments, each end user reviewer may be presented with a limited selection of possible enforcement decision choices, such as enforce 410 and do not enforce 412. The "enforce" and "do not enforce" choices as presented on an end user reviewer user interface may be customized for particular controversy types. For example, in the context of a user name dispute, the "enforce" option may be presented in the form of a selectable control labeled "offensive," and the "do not enforce" option may be a control labeled "not offensive." Further, in some instances, end user reviewers also may be given a "pass" option 414, which allows the end user reviewer to decline to make a decision on the controversy presented. In other embodiments, end user reviewers may be presented with any other suitable options for entering enforcement decisions.

Method 400 next comprises, at 416, determining if an enforcement threshold was met. This determination may be made in any suitable manner. As one non-limiting example, an enforcement threshold may comprise a threshold trust score in combination with a threshold level of consensus for enforcement, as indicated at 418. The trust score may be determined, for example, from a sum of, or other computation using, the accuracy weightings of each end user reviewer that made an enforcement decision, wherein the accuracy weightings are determined from federation membership. In this manner, users from more accurate enforcement federations contribute more to the trust score. In other embodiments, any other suitable threshold may be used. Further, in some embodiments, other factors may be taken into account, such as enforcement risk of the complaint target (e.g. has the complaint target violated policies before) and other risk factors.

If the enforcement threshold for enforcing the policy is met (e.g. threshold consensus combined with threshold trust), then method 400 comprises, at 420, automatically enforcing the policy rule and storing the enforcement decision for the controversy. For example, if the policy rule regards acceptable user names, automatically enforcing the policy rule may comprise automatically disallowing use of the user name determined by the end user reviewers to violate the policy.

On the other hand, if the enforcement threshold is not met, then it is determined at 422 whether a threshold non-enforcement threshold is met. The non-enforcement threshold may comprise, for example, a threshold trust score combined with a threshold consensus level for non-enforcement, as indicated at 423. Thus, if the non-enforcement threshold is met, then method 400 comprises, at 424, not enforcing the rule and storing the non-enforcement decision for the controversy.

If neither the enforcement nor non-enforcement thresholds are met, then method 400 comprises determining, at 426, whether a close controversy exists. A close controversy may exist, for example, where a sufficient trust score has been achieved, but where a threshold consensus on enforcement or non-enforcement has not been met, as indicated at 427. In this instance, the current controversy may be sent to an administrative reviewer for an administrative-level decision, as indicated at 428.

If none of the above thresholds have been met, the information regarding the current controversy may continue to be sent to end user reviewers until one of the above-described thresholds is met, or until a predetermined amount of time has passed since receiving notification, as indicated at 430. If none of the above thresholds are met within the predetermined amount of time has passed, then method 400 comprises sending the current controversy to an administrative reviewer at 428 for administrative-level decision. This may help to ensure that all current controversies are addressed within a reasonable amount of time.

Where the decision was provided to an administrative reviewer, method 400 comprises, at 432, receiving and enforcing the administrative-level policy decision, and at 434, storing the administrative-level policy decision. The stored end user reviewer decisions and administrative-level policy decisions may then be used to calibrate both current and new end user reviewers for the purpose of assigning the end user reviewers to enforcement federations. As such, method 400 comprises, at 436, providing previously-stored policy decisions to end user reviewers, and at 438, receiving calibration decisions from the end user reviewers. The calibration decisions received may then be compared to the stored decisions to determine end user reviewer accuracies and to assign the end user reviewers to enforcement federations, as indicated at 440. This may help to ensure that the federation membership of each end user reviewer reflects that end user reviewer's current accuracy level. This also may help to avoid issues that can arise, for example, if one user adopts another user's account.

As mentioned above, the description of method 400 assumes that an established end user reviewer system is fully implemented. However, the establishment and implementation of an end user reviewer system may pose various challenges. For example, when establishing a new end user reviewer system, the system may have no data on end user reviewer accuracies. Further, even after some form of accuracy data is obtained, it may be unclear how well the determined accuracies predict future correlation with administrative decisions on future controversies.

As such FIG. 5 shows a flow diagram illustrating an embodiment of a method 500 for implementing an end user reviewer system for deciding policy controversies. Method 500 illustrates three phases. First, at 502, an initial phase is illustrated, in which accuracies of end user reviewers are calibrated against previously stored administrative-level policy decisions. This process may be referred to as a calibration process, and is described in more detail below with reference to FIG. 7. In the initial phase, current controversies may be provided first to administrative reviewers, and then to end user reviewers for accuracy determination.

Next, at 504, an intermediate phase is illustrated in which calibration and arbitration processes are performed. The term "arbitration process" refers to a process in which current controversies are first provided to end user reviewers as opposed to administrators, but where decisions from end user reviewers are forwarded to an administrative reviewer for verification, such that the final stored enforcement decision is made by the administrative reviewer. In the arbitration process, details of the end user reviewer system (e.g. weighting values, federation definitions, etc.) may be evaluated and refined prior to full implementation. An example arbitration process is described below with FIG. 8.

Finally, at 506, a full implementation phase is illustrated, in which oversight and calibration processes are performed. The term "oversight" as used herein refers to a process in which end user reviewer decisions may be automatically enforced, but where administrative reviewers may assist with close controversies and other situations.

Figure 7:
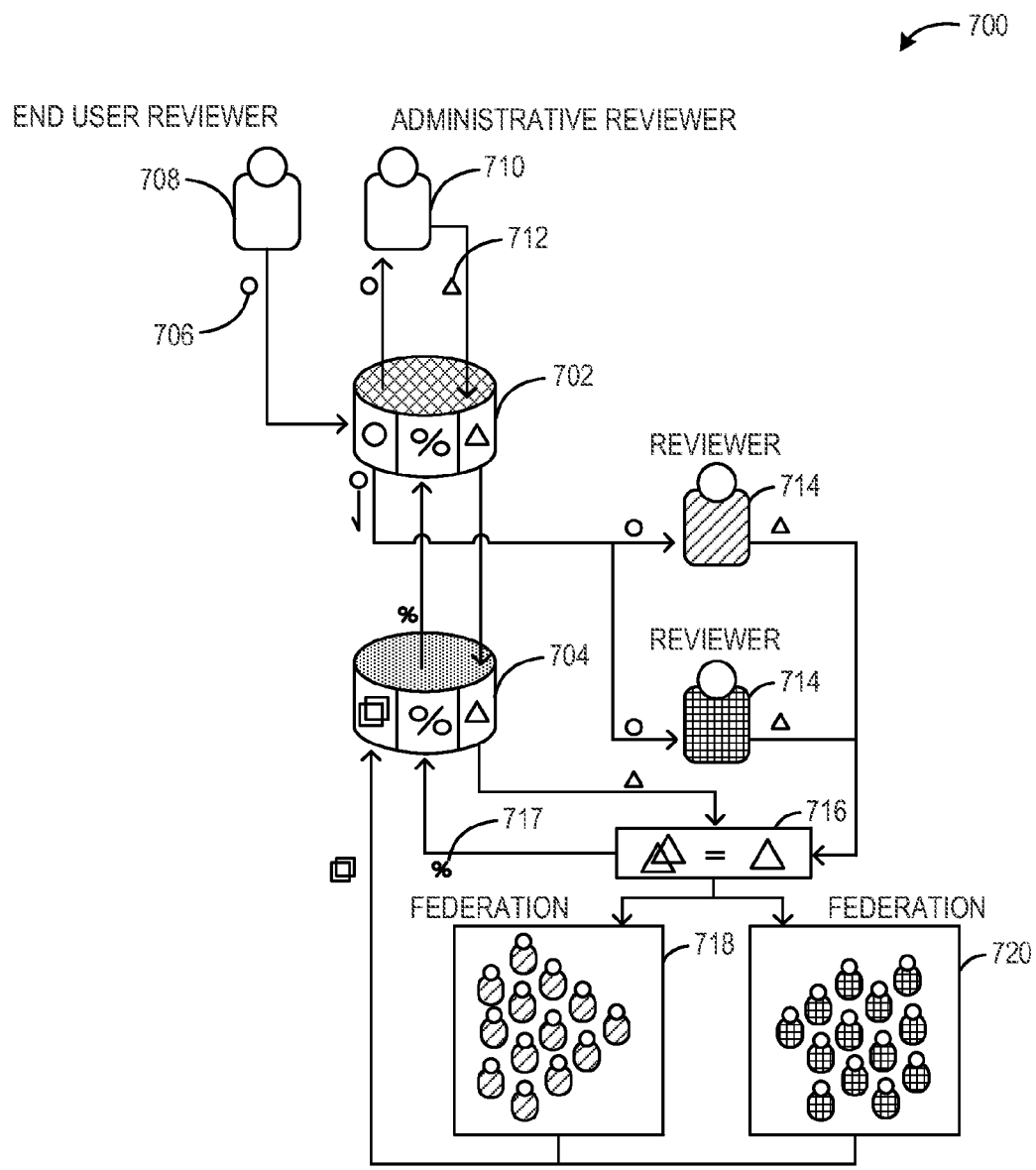
FIG. 7 shows a schematic depiction of an embodiment of a calibration process for an end user reviewer-based policy decision system.
Figure 8:
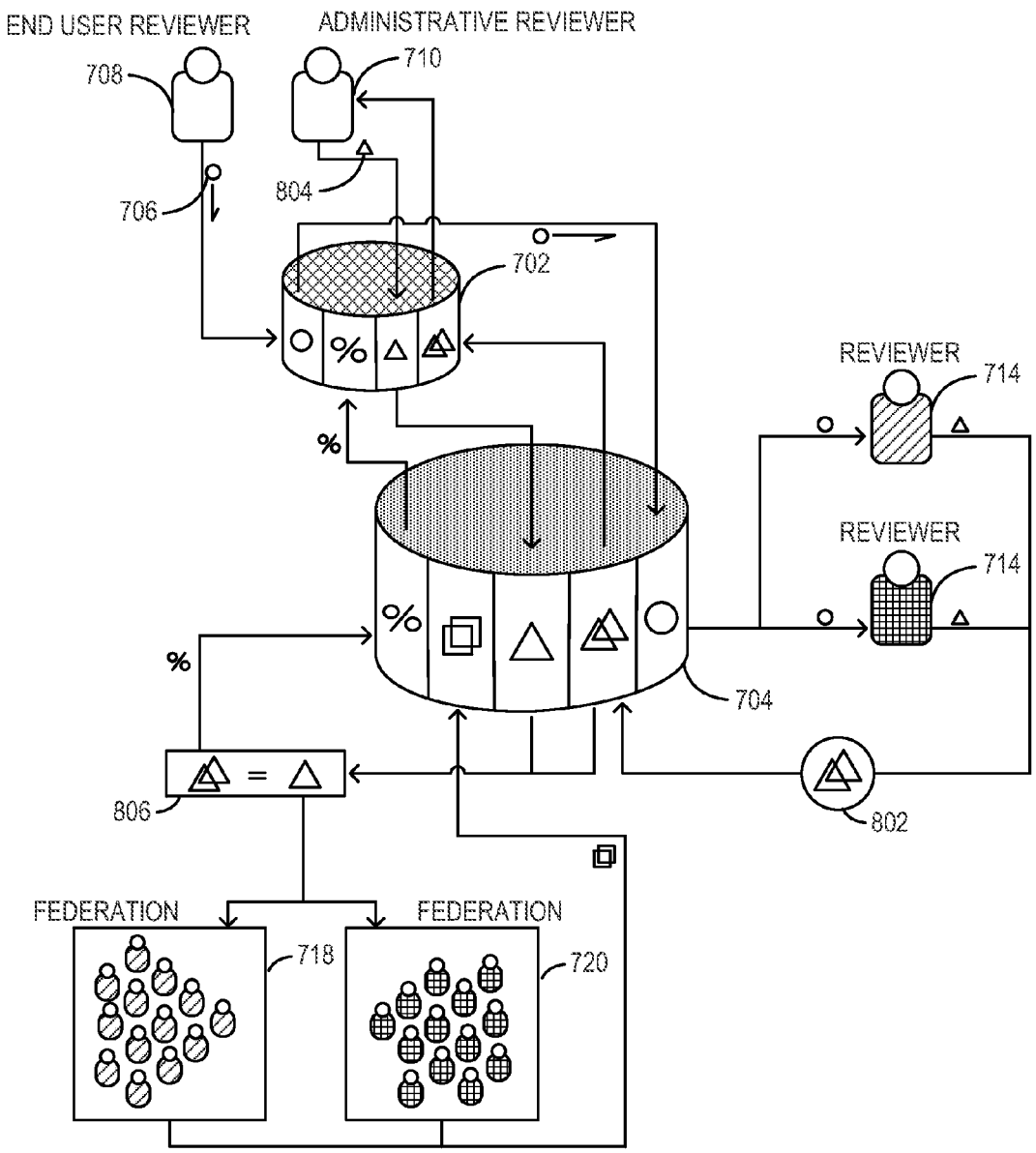
FIG. 8 shows a schematic depiction of an embodiment of an arbitration process for an end user reviewer-based policy decision system.
Figure 9:
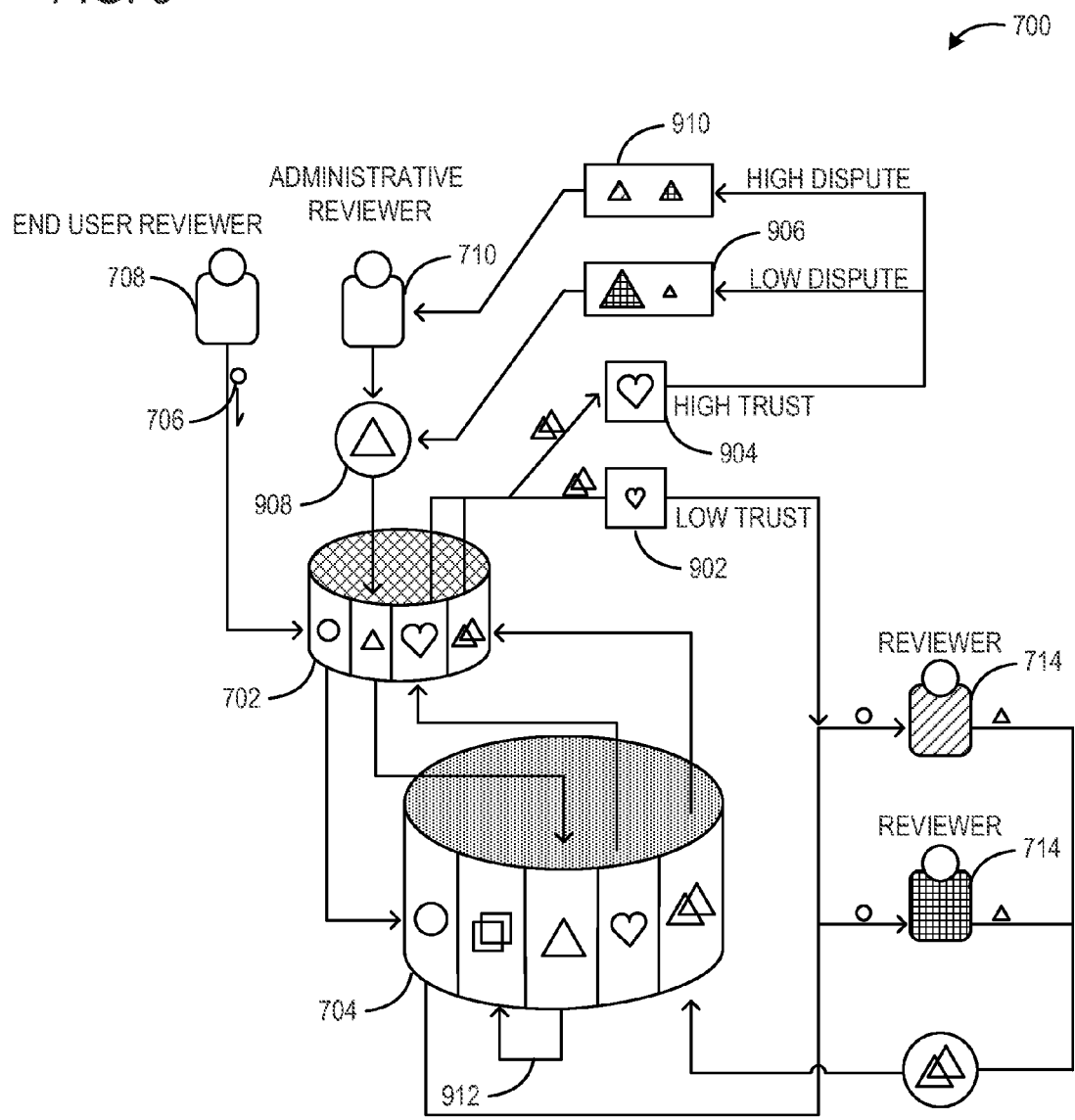
FIG. 9 shows a schematic depiction of an embodiment of an oversight process for an end user reviewer-based policy decision system.

FIG. 6 shows a legend for the symbols used in FIGS. 7-9. It will be understood that the examples of FIGS. 7-9 are shown for illustration and are not intended to be limiting, as any other suitable process may be used to calibrate and implement an end user review system.

FIG. 7 shows a schematic depiction of an end user reviewer system 700, and illustrates data flow through the system in a calibration process. System 700 includes an existing policy enforcement platform 702 which stores historical data on policy controversies and administrative decisions. System 700 also includes an end user review platform 704 to be calibrated for eventual use in deciding current policy controversies. It will be understood that FIGS. 7-9 show non-limiting example methods for implementing an end user review system for where an existing administrative policy review system can be leveraged. In other implementations, any other suitable system architecture may be used.

Policy controversy notifications 706 from end users 708 flow into the existing policy enforcement platform 702, and are stored and forwarded to an administrative reviewer 710 for decision. The decision 712 of the administrative reviewer is then stored in the existing policy enforcement platform 702. Further, stored policy controversies and corresponding administrative decisions are also provided to the end user review platform 704, and then to end user reviewers 714. End user reviewer decisions are compared to corresponding administrative decisions to determine an accuracy of each end user reviewer, as indicated at 716, and the resulting accuracy is stored for each user, as indicated at 717. Decisions that agree with the administrative decision boost the end user reviewer's accuracy, while decisions not in agreement decrease the accuracy. Based upon the determined accuracy, each end user reviewer is placed into an enforcement federation, two of which are shown at 718 and 720, and the federation membership is stored along with the accuracy value for each end user reviewer.

It will be understood that calibration may be interleaved with other operating processes throughout all phases of deployment of the end user review system to ensure that the federation for each end user reviewer reflects the end user reviewer's current accuracy. Thus, because calibration may be used as both a gate to participating in the system as well as a series of ongoing checkpoints, calibration may allow individuals who do not demonstrate conformance to community standards to be blocked from participating, and to prevent users with low accuracy from making decisions other than calibration decisions until accuracy improves.

FIG. 8 shows an example embodiment of an arbitration process utilizing system 700. In the arbitration process, incoming policy controversy notifications 706 received at existing policy enforcement platform 702 are first provided to the end user review platform 704, rather than directly to administrative reviewers, for review by end user reviewers 714. End user reviewer decisions 802 received are stored at the end user review platform 704, and also provided to the existing policy enforcement platform 702. The end user reviewer decisions 802 are then reviewed by an administrative reviewer 710 to determine whether the administrative reviewer 710 agrees with the decision, and the administrative decision 804 of the administrative reviewer 710 is stored at both platforms. The end user review platform 704 may then compare the administrative decision 804 to the received end user reviewer decisions to further calibrate the end user reviewers 714, as indicated at 806, and potentially adjust federation memberships. Updated accuracies and federation memberships are stored after determination. The arbitration process thus allows an administrative reviewer to check the accuracy of end user reviewer decisions and make any adjustments before transitioning to a system in which end user reviewer decisions are automatically enforced via an oversight process.

FIG. 9 shows an example embodiment of an oversight process utilizing system 700. In the oversight process, incoming policy controversy notifications 706 received at existing policy enforcement platform 702 are again provided first to the end user review platform 704, rather than directly to administrative reviewers, but administrative reviewers do not review every community decision. Instead, administrative reviewers review a smaller subset of decisions, such as where the end user reviewers cannot reach a community decision or too few end user reviewers reply within a determined time from receiving the policy controversy notification. Thus, in the oversight phase, the multi-user interactive computing environment is largely self-policing.

Policy controversy notifications flow into the system as in the arbitration example of FIG. 8. Continuing with FIG. 9, an incoming policy controversy notification is presented to end user reviewers, and decisions received from the end user reviewers are stored at the end user review platform 704 as well as the existing policy enforcement platform 702. Further, trust scores are determined for the end user reviewer decisions, such that cumulative decisions with a trust score not meeting a threshold level, as indicated at 902, are fed back into the end user review process to accumulate additional decisions (and thus additional trust value), while cumulative decisions meeting the threshold trust level (as indicated at 904) and also a threshold consensus level (i.e. having low dispute 906) are automatically enforced, as indicated at 908. The consensus level is shown in FIG. 9 by relative sizes of two triangles that indicate different decisions, where the large difference in triangle sizes at 906 shows that a large majority of users selected one decision over another.

The trust score may be determined in any suitable manner. For example, the trust score may be determined based upon the accuracy weightings of the end user reviewers based upon their federation memberships, such that more decisions from members of federations with higher trust increase a trust score more quickly. Values with high trust but high dispute 910 (e.g. where trust score is high but the community decision is neutral or closely divided, as shown schematically by equal sized triangles) may be forwarded to an administrative reviewer 710 for decision. Further, the administrative reviewer decisions may be provided to the end user reviewer system for use in updating federation memberships based upon a comparison of the decisions of end user reviewers and the administrative reviewer decisions, as shown at 912. For example, the administrative policy decision may be compared to one or more end user reviewer decisions to generate calibration decisions. The final decisions, whether enforced automatically or made administratively, may be stored for future calibration processes. Further, the decision of each end user reviewer that participated in the decision may be evaluated against the final decisions to update the accuracy of the end user.

Figure 10:
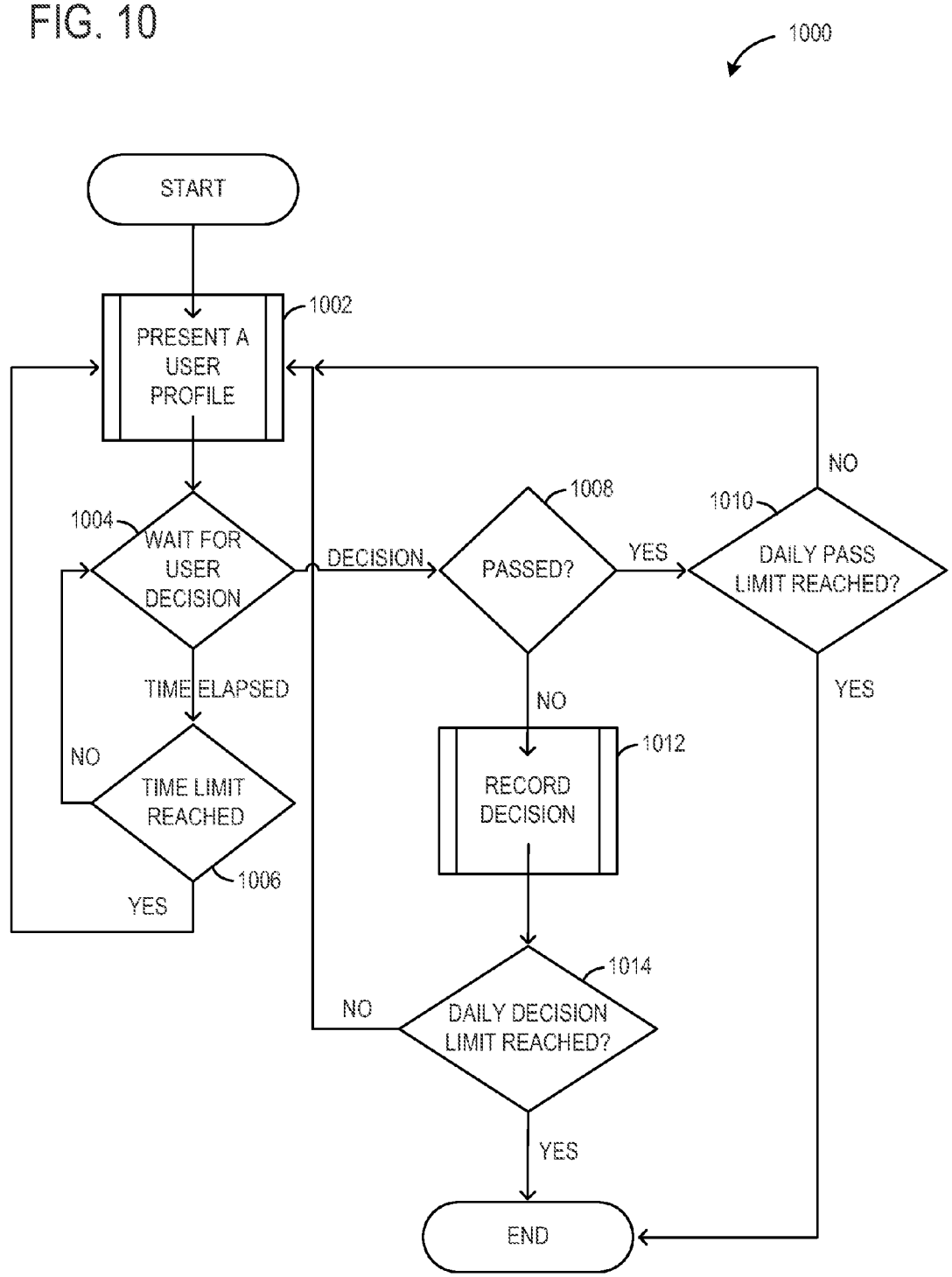
FIG. 10 shows a flow diagram depicting an embodiment of a method for presenting policy controversies to end user reviewers and receiving decisions from end user reviewers.

FIG. 10 shows a flow diagram depicting an example embodiment of a method 1000 for presenting policy controversies to end user reviewers and receiving decisions from end user reviewers. It will be understood that method 1000 is intended to be illustrative and not limiting, as policy controversies may be presented to end user reviewers in any other suitable manner.

Figure 11:
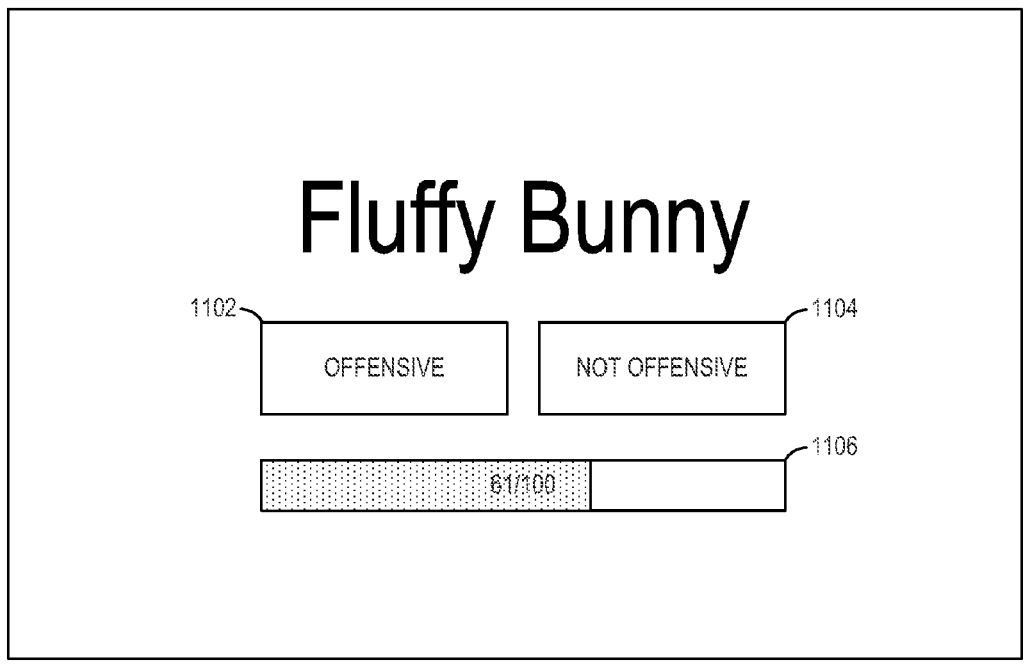
FIG. 11 shows an example embodiment of a user interface for presenting a policy controversy to an end user reviewer.

Method 1000 comprises, at 1002, displaying a policy controversy (current or past, depending upon whether an oversight/arbitration or calibration process is being performed), such as a disputed user name or profile, to an end user reviewer. The policy controversy may be obtained from a remote policy controversy management service, as described above, or from any other suitable location and/or entity. Further, the policy controversy may be presented in any suitable manner. For example, as shown in FIG. 11, the policy controversy may be presented via a user interface 1100 that also provides interactive controls with which an end user reviewer may enter a policy decision. In the depicted embodiment, a user profile for username "FLUFFY BUNNY" is presented, and selectable user interface controls allow the end user reviewer to rate the user profile "offensive" 1102 or "not offensive" 1104. The depicted user interface 1100 also comprises a representation 1106 of a daily limit on a number of decisions the end user reviewer is allowed to provide as compared to a number of decisions made thus far. It will be understood that other embodiments may not use such limits. Further, while the depicted embodiment shows a single set of offensive/not offensive controls for rating the entire user profile, in other embodiments, individual fields of a profile or other item under controversy may have corresponding individual selectable decision controls.

Returning to FIG. 10, method 1000 further comprises at 1004, waiting for the user to enter a decision. If a decision is not reached before a predetermined time limit is reached, as indicated at 1006, then a new current policy controversy may be presented, and the inaction may be interpreted as a "pass." A countdown timer may be presented to inform an end user reviewer of the time limit.

On the other hand, if a decision is reached, method 1000 comprises, at 1008, determining whether the decision is a "pass." If the decision is a "pass," then method 1000 comprises, determining, at 1010, if a daily pass limit has been reached. If so, then method 1000 ends until a new policy controversy review session is launched on a different day. Otherwise, method 1000 comprises presenting another user name or other current policy controversy.

If the decision is not a "pass," then method 1000 comprises, at 1012, recording the decision, for example by sending the decision to remote policy controversy management service for storage. Method 1000 further comprises determining, at 1014, whether a daily decision limit has been reached. If so, then method 1000 ends. Otherwise, another controversy may be presented. Limiting volume of decisions and passes per end user review session may help to manage supply and demand within the end user review system. However, other embodiments may not utilize time limits, pass limits, and/or decision limits.

In this manner, both current and past controversies may be presented without any indication of whether a presented controversy is past or current, such that the end user reviewer does not know whether a controversy being presented is for the purpose of calibration or arbitration/oversight. This may help to avoid instances where end user reviewers respond with different intent toward current controversies than for past controversies used for calibration. In the case of a new end user reviewer, the new end user reviewer may be initially presented with a set of past controversies for the purpose of calibration before being presented with current controversies. It will be understood that other embodiments may not utilize time limits, decision limits, and/or pass limits such as those shown in FIG. 10.

Figure 12:
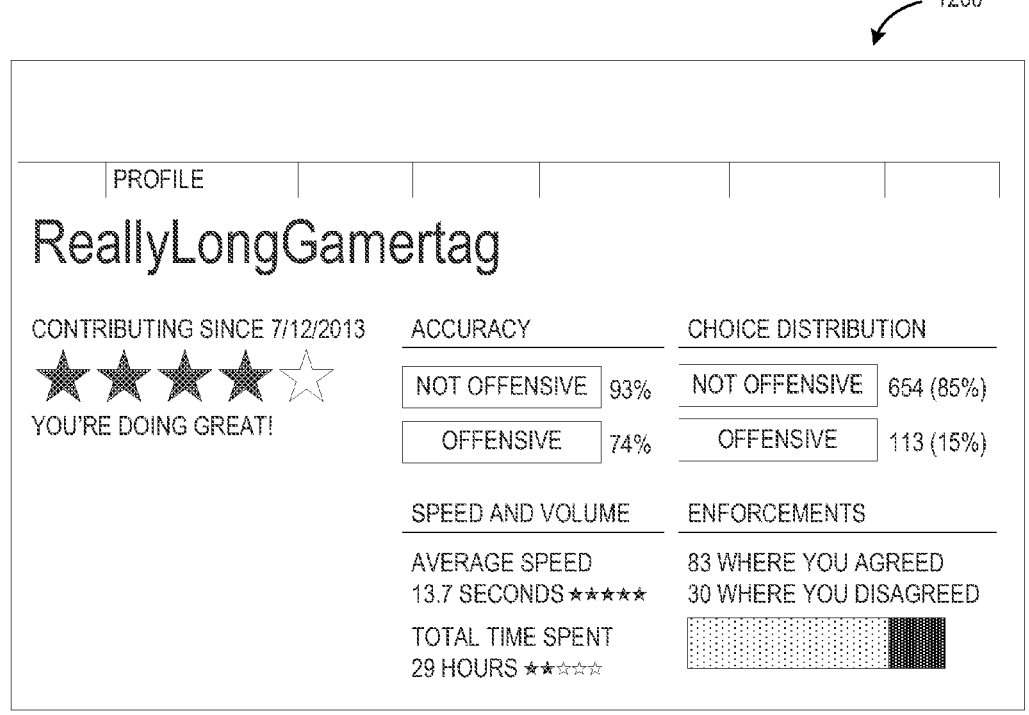
FIG. 12 shows an example embodiment of a user interface for presenting enforcement statistics to an end user reviewer.

Information regarding the performance of an end user reviewer may be communicated to the end user reviewer in some embodiments. FIG. 12 shows an embodiment of a user interface 1200 configured to present reviewing statistics to an end user reviewer having the user name "REALLYLONG-GAMERTAG." The user interface 1200 comprises accuracy information for "not offensive" and "offensive" decisions. Further, the user interface also comprises information regarding a total number of each type of decision, productivity statistics (e.g. speed and volume), and a total number of enforcements that arose from current controversies on which the end user reviewer made a decision. It will be understood that the information shown is presented for the purpose of example, and is not intended to be limiting in any manner.

According to the embodiments disclosed above, a largely self-policing end user policy controversy enforcement system may be calibrated with historical data and/or current data, and then used to automate many policy enforcement tasks that would otherwise be performed by administrative reviewers. This may help to reduce administrative reviewer staffing needs, and also may allow end users to feel more of a sense of ownership and responsibility in a multi-user interactive computing environment.

In some embodiments, the methods and processes described above may be tied to a computing system of one or more computing devices. In particular, such methods and processes may be implemented as a computer-application program or service, an application-programming interface (API), a library, and/or other computer-program product.

Figure 13:
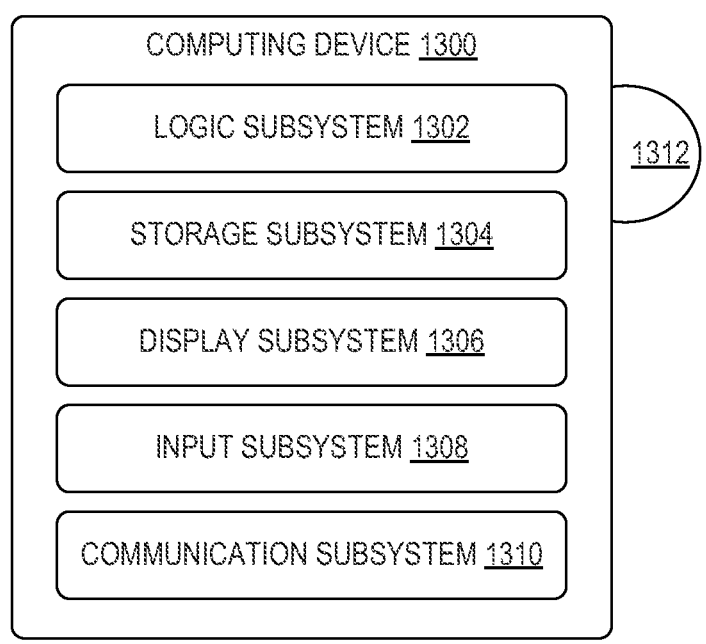
FIG. 13 shows an example embodiment of a computing device.

FIG. 13 schematically shows a non-limiting embodiment of a computing system 1300 that can enact one or more of the methods and processes described above. Computing system 1300 is shown in simplified form. It will be understood that virtually any computer architecture may be used without departing from the scope of this disclosure. In different embodiments, computing system 1300 may take the form of a mainframe computer, server computer, desktop computer, laptop computer, tablet computer, home-entertainment computer, network computing device, gaming device, mobile computing device, mobile communication device (e.g., smart phone), etc.

Computing system 1300 includes a logic subsystem 1302 and a storage subsystem 1304. Computing system 1300 may optionally include a display subsystem 1306, input subsystem 1308, communication subsystem 1310, and/or other components not shown in FIG. 13.

Logic subsystem 1302 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 1304 includes one or more physical devices configured to hold data and/or instructions executable by the logic subsystem to implement the methods and processes described herein. When such methods and processes are implemented, the state of storage subsystem 1304 may be transformed—e.g., to hold different data.

Storage subsystem 1304 may include removable media and/or built-in devices. Storage subsystem 1304 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 1304 may include volatile, nonvolatile, dynamic, static, read/write, read-only, random-access, sequential-access, location-addressable, file-addressable, and/or content-addressable devices.

It will be appreciated that storage subsystem 1304 includes one or more physical and excludes propagating signals per se. However, in some embodiments, aspects of the instructions described herein may be propagated as a pure signal (e.g., an electromagnetic signal, an optical signal, etc.) via a transmission medium. Furthermore, data and/or other forms of information pertaining to the present disclosure may be propagated by a pure signal.

In some embodiments, aspects of logic subsystem 1302 and of storage subsystem 1304 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 1300 implemented to perform a particular function. In some cases, a module, program, or engine may be instantiated via logic subsystem 1302 executing instructions held by storage subsystem 1304. It will be understood that different modules, programs, and/or engines may be instantiated from the same application, service, code block, object, library, routine, API, function, etc.

Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1306 may be used to present a visual representation of data held by storage subsystem 1304. This visual representation may take the form of a graphical user interface (GUI). As the herein described methods and processes change the data held by the storage subsystem, and thus transform the state of the storage subsystem, the state of display subsystem 1306 may likewise be transformed to visually represent changes in the underlying data. Display subsystem 1306 may include one or more display devices utilizing virtually any type of technology. Such display devices may be combined with logic subsystem 1302 and/or storage subsystem 1304 in a shared enclosure, or such display devices may be peripheral display devices.

When included, input subsystem 1308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple computing system 1300 with one or more other computing devices. Communication subsystem 1310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1300 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device comprising a processor, a method of enforcing end user policies in an interactive multi-user environment, the method comprising:

receiving via the processor a notification of a current policy controversy;

sending via the processor information regarding the current policy controversy to each end user reviewer of a plurality of end user reviewers, each end user reviewer being a member of an enforcement federation of a plurality of enforcement federations;

receiving via the processor a plurality of enforcement decisions from one or more responding end user reviewers of the plurality of end user reviewers;

upon the plurality of enforcement decisions meeting an enforcement threshold, automatically enforcing via the processor a policy rule, wherein the enforcement threshold comprises a threshold trust compared to a trust score determined via an accuracy weighting of the one or more responding end users.

2. The method of claim 1, wherein each enforcement federation of the plurality of enforcement federations has an associated accuracy weighting, and wherein the enforcement threshold is determined based upon the federation membership of each of the one or more responding end users.

3. The method of claim 2, further comprising not enforcing the policy rule until a trust score is reached that meets the threshold trust and a consensus is reached that meets a threshold consensus.

4. The method of claim 3, further comprising continuing to send information regarding the current policy controversy to end user reviewers until the threshold trust is reached.

5. The method of claim 2, wherein, if the decision score does not reach the threshold trust within a predetermined amount of time, then sending the information regarding the current controversy to an administrative reviewer.

6. The method of claim 5, further comprising receiving an administrative policy decision from the administrative reviewer, storing the administrative policy decision, then comparing the administrative policy decision to one or more end user reviewers and generating a calibration decision.

7. The method of claim 2, wherein, if the threshold trust is met but a threshold consensus is not met, then further comprising sending the information regarding the current controversy to an administrative reviewer.

8. The method of claim 1, further comprising receiving a "pass" decision from one or more end user reviewers.

9. The method of claim 1, further comprising sending information regarding a plurality of past controversies to each end user reviewer of the plurality of end user reviewers and receiving calibration decisions from the one or more end user reviewers.

10. The method of claim 9, further comprising, for each end user reviewer, assigning the end user reviewer to a selected enforcement federation based upon an accuracy at which the calibration decisions of the end user reviewer compare past administrative decisions to the past controversies.

11. The method of claim 10, further comprising adjusting an enforcement federation membership of the selected user based upon comparing calibration decisions of the selected user to one or more additional past controversies presented to the selected user interleaved with current controversies.

12. The method of claim 1, wherein automatically enforcing a policy decision in response to the current policy controversy is performed in a final implementation phase, and further comprising sending policy decisions that meet a policy decision threshold to an administrative reviewer instead of automatically enforcing the policy decision in an arbitration process performed before the final implementation phase.

* * * * *